(12) United States Patent
Shinomiya et al.

(10) Patent No.: US 6,259,901 B1
(45) Date of Patent: Jul. 10, 2001

(54) RADIO-FREQUENCY POWER AMPLIFIER OF MOBILE COMMUNICATION EQUIPMENT

(75) Inventors: Yoshitaka Shinomiya; Takeshi Imai, both of Tokyo (JP)

(73) Assignee: Mobile Communications Tokyo Inc., Tokyo (JP)

( * ) Notice: Subject to any disclaimer, the term of this patent is extended or adjusted under 35 U.S.C. 154(b) by 0 days.

(21) Appl. No.: 09/203,642

(22) Filed: Dec. 1, 1998

(30) Foreign Application Priority Data

Jul. 3, 1998 (JP) .................................. 10-188687
Jul. 3, 1998 (JP) .................................. 10-188688

(51) Int. Cl.[7] .............................. H01Q 11/12; H04B 1/04
(52) U.S. Cl. .............................. 455/127; 455/91; 330/65; 330/133; 330/134; 330/254; 330/255
(58) Field of Search .................... 455/91, 95, 115, 455/116, 127; 330/65, 66, 67, 68, 129, 133, 134, 254, 255

(56) References Cited

U.S. PATENT DOCUMENTS

| | | |
|---|---|---|
| 4,356,452 | 10/1982 | Iwamatsu . |
| 4,975,659 | * 12/1990 | Butler et al. ........................ 330/307 |
| 4,994,757 | 2/1991 | Bickley et al. . |
| 5,066,925 | * 11/1991 | Frietag ............................... 330/269 |
| 5,107,225 | 4/1992 | Wheatley, III et al. . |
| 5,121,079 | * 6/1992 | Dargatz .............................. 330/258 |
| 5,126,688 | 6/1992 | Nakanishi et al. . |
| 5,136,257 | * 8/1992 | Reading .............................. 330/129 |
| 5,159,283 | 10/1992 | Jensen . |
| 5,196,806 | 3/1993 | Ichihara . |
| 5,222,104 | 6/1993 | Medendorp . |
| 5,283,536 | 2/1994 | Wheatley, III et al. . |
| 5,337,020 | 8/1994 | Daughtry et al. . |
| 5,432,473 | 7/1995 | Mattila et al. . |
| 5,589,796 | 12/1996 | Alberth, Jr. et al. . |
| 5,646,579 | 7/1997 | Feldt et al. . |
| 5,825,247 | 10/1998 | Herrlinger . |
| 5,828,269 | 10/1998 | Wong et al. . |
| 5,844,443 | 12/1998 | Wong . |
| 5,880,631 | 3/1999 | Sahota . |
| 5,912,588 | 6/1999 | Nummila . |
| 6,029,074 | 2/2000 | Irvin . |
| 6,122,491 | * 12/1996 | Francisco .......................... 455/127 |

OTHER PUBLICATIONS

Young J. Shin and Klaas Bult, An Inductor less 900MHz Low–Noise Amplifier in 0.9um CMOS, IEEE 1997 Custom Integrated Circuits Conference, p. 513–516.*

* cited by examiner

*Primary Examiner*—Nay Maung
*Assistant Examiner*—Lewis G. West
(74) *Attorney, Agent, or Firm*—Frishauf, Holtz, Goodman, Langer & Chick, P.C.

(57) ABSTRACT

A radio-frequency power amplifier of mobile communication equipment includes a differential amplifier arranged to balanced-input and amplify a radio-frequency signal delivered from a frequency converter of a transmission system of the mobile communication equipment located downstream of a modulator of the transmission system. The radio-frequency signal delivered from the differential amplifier is further amplified and balanced-output by a push-pull circuit. The differential amplifier and the push-pull circuit are respectively supplied with bias currents varying in dependence on a gain control signal, whereby respective amplification gains of the differential amplifier and the push-pull circuit are variably adjusted.

19 Claims, 5 Drawing Sheets

RADIO-FREQUENCY POWER AMPLIFIER OF MOBILE COMMUNICATION EQUIPMENT

BACKGROUND OF THE INVENTION

1. Technical Field

The present invention relates to a radio-frequency (RF) power amplifier of mobile communication equipment, and more particularly, to an RF power amplifier of portable mobile communication equipment which improves the quality of a transmission signal and reduces its electric power consumption.

2. Related Art

A mobile communication system has been widely utilized for radio-frequency communication between a number of pieces of mobile. communication equipment and base stations located at a distance from one another in a service area. Such communication system is constructed in various manners in accordance with the purpose of service or the like. For example, in a land-based mobile communication system, the mobile communication equipment is realized as a car telephone, a portable telephone or the like which, when used, is connected with a public telephone network through a base station and a radio link control station.

A typical portable telephone comprises an equipment body including transmission/receiver sections, a telephone set including telephone transmitter/receiver, and an antenna. The equipment body with which the telephone set and the antenna are formed into one piece accommodates therein a battery serving as a power source. The transmitter section includes a sonic-electric converter, modulator, frequency converter, and radio-frequency (RF) power amplifier. Voice applied through a telephone transmitter to the transmission section is subject to sonic-electric conversion, modulation, frequency conversion and power amplification and is radiated in the form of a radio wave.

Conventionally, an RF power amplifier of a transmission section is usually formed solely by single-ended circuits which have a proven track record in hybrid ICs, and is mounted on a printed circuit board or printed wiring board of mobile communication equipment, with the RF power amplifier connected with an RF grounding pattern formed in the circuit board. The RF power amplifier constructed as mentioned above is liable to be affected by the RF grounding pattern, so that the amplification gain and the distortion factor are likely to change, resulting in degraded quality of the transmission signal.

In the case of land-based mobile communication based on a code division multiple access (CDMA) system, the electric field strengths of radio waves transmitted from all the pieces of mobile communication equipment which commonly utilize the same frequency are preferably equalized at the base station. To this end, for example, each mobile communication equipment is arranged to adjust the transmission output power in accordance with a transmission power control signal (gain control signal) transmitted from the base station.

A conventional portable telephone whose transmission section includes an RF power amplifier composed of a single-ended circuit is arranged to make a transmission output adjustment, e.g., by applying the gain control signal to an automatic gain control (AGC) circuit disposed between a modulator and a frequency converter which are located upstream of the RF power amplifier. In other words, generally, the transmission output adjustment is not performed based on a gain adjustment of the single-ended circuit (RF power amplifier) for the reason that the single-ended circuit is likely to operate abnormally to cause undesired oscillation, etc., if the bias current applied thereto is changed so as to change the amplification gain of the single-ended circuit.

Therefore, the RF power amplifier of a conventional portable telephone is arranged to make an amplifying action at a fixed gain. This causes a significant reduction in the power efficiency of the RF power amplifier, especially, in a range of low transmission output level. On the other hand, at the time of transmission, the power consumption of the RF power amplifier makes up a large proportion of the entire power consumption of the mobile communication equipment. Thus, an improvement of power efficiency of an RF power amplifier is intensively demanded, especially in portable mobile communication equipment which is frequently operated in a low output level range and the power source of which is comprised of a battery.

SUMMARY OF THE INVENTION

An object of the present invention is to provide a radio-frequency power amplifier of mobile communication equipment, which prevents a degraded quality of a transmission signal caused by affection of a radio-frequency grounding pattern of a circuit board of the mobile communication equipment on which board the amplifier is mounted.

Another object of the present invention is to provide a radio-frequency power amplifier of mobile communication equipment, which is excellent in power efficiency especially in a range of low transmission output level.

A still further object of the present invention is to provide a radio-frequency power amplifier of mobile communication equipment, the amplification gain of which can be controlled easily and stably.

A further object of the present is to provide a radio-frequency power amplifier of mobile communication equipment, which makes it possible to realize a compact, power saving radio-frequency module having a circuit board on which the radio-frequency power amplifier is mounted together with modulator and frequency converter sections to form a radio-frequency section of a transmitter system of the mobile communication equipment.

According to one aspect of the present invention, a radio-frequency power amplifier of mobile communication equipment comprises: an input stage comprised of at least one differential amplifier arranged to balanced-input and amplify a radio-frequency signal delivered from a frequency converter section of a transmission system of the mobile communication equipment located downstream of a modulator section of the transmission system; and a bias current circuit for supplying said at least one differential amplifier with a bias current varying in dependence on a gain control signal, to thereby variably set a gain of said at least one differential amplifier, said radio-frequency power amplifier being mounted on a circuit board of the mobile communication equipment, said circuit board being formed with a radio-frequency grounding pattern.

Preferably, said input stage of said radio-frequency power amplifier is comprised of a plurality of differential amplifiers which are direct-coupled to one another, and said bias current circuit is provided for each of said plurality of differential amplifiers.

With the radio-frequency power amplifier, the input stage comprised of a differential amplifier which inputs the radio-frequency signal in a balanced manner is virtually grounded with respect to the radio-frequency grounding pattern of the circuit board of the mobile communication equipment on which the radio-frequency power amplifier is mounted. In other words, the differential amplifier which forms the input stage of the radio-frequency power amplifier performs an amplification action under a floating state with respect to the radio-frequency grounding pattern, so that the power amplifier can amplify the radio-frequency signal while maintaining the linearity of the power amplifier, without being affected by the radio-frequency grounding pattern. Since the amplification gain of the differential amplifier can be changed by changing a bias current applied to the differential amplifier in accordance with a gain control signal, the amplification gain can be variably set with ease and stability.

According to another aspect of the present invention, a radio-frequency power amplifier of mobile communication equipment comprises: an output stage comprised of a push-pull circuit arranged to amplify and balanced-output a radio-frequency signal received through and input stage of said amplifier from a frequency converter of a transmission system of the mobile communication equipment located downstream of a modulator of the transmission system; and a bias current circuit for supplying said push-pull circuit with a bias current varying in dependence on a gain control signal, said radio-frequency power amplifier being mounted on a circuit board of the mobile communication equipment, said circuit board being formed with a radio-frequency grounding pattern.

Preferably, said bias current circuit varies an operating current of a constant current circuit connected with bases of a pair of transistors which form said push-pull circuit, to thereby vary the bias current applied to said push-pull circuit.

With the radio-frequency power amplifier, the output stage comprised of a push-pull circuit amplifies a radio-frequency signal and balanced-outputs the amplified radio-frequency signal. That is, the radio-frequency power amplifier makes an amplifying action under a condition that it is virtually grounded with respect to the radio-frequency grounding pattern of the circuit board of the mobile communication equipment on which the radio-frequency power amplifier is mounted, so that the power amplifier stably operates without being affected by the radio-frequency grounding pattern. Since the bias current applied to the push-pull circuit which forms the output stage is changed in accordance with a gain control signal so as to permit the transmission output of the mobile communication equipment to have an optimum level, the transmission output level can be varied with ease and stability, and electric power loss in the radio-frequency power amplifier especially in a low output level range can be reduced. Thus, the power efficiency of the radio-frequency power amplifier can be improved.

According to a further aspect of the present invention, a radio-frequency power amplifier of mobile communication equipment comprises: an input stage comprised of at least one differential amplifier arranged to balanced-input and amplify a radio-frequency signal delivered from a frequency converter section of a transmission system of the mobile communication equipment located downstream of a modulator section of the transmission system; a first bias current circuit for supplying said at least one differential amplifier with a bias current varying in dependence on a gain control signal, to thereby variably set a gain of said at least one differential amplifier; an output stage comprised of a push-pull circuit arranged to amplify the radio-frequency signal amplified in and delivered from said input stage and to balanced-output the thus amplified radio-frequency signal; and a second bias current circuit for supplying said push-pull circuit with a bias current varying in dependence on the gain control signal, said radio-frequency power amplifier being mounted on a circuit board of the mobile communication equipment, said circuit board being formed with a radio-frequency grounding pattern.

The just-mentioned radio-frequency power amplifier according to the third aspect of this invention attains advantages similar to those of the power amplifiers according to the first and second aspects of this invention. That is, the radio-frequency signal can be amplified while maintaining the linearity of the power amplifier, without being affected by the radio-frequency grounding pattern. Further, the transmission output level can be varied with ease and stability, and electric power loss In the radio-frequency power amplifier especially in a low output level range can be reduced.

In the present invention, preferably, the gain control signal is a signal which is transmitted from a base station or a control section of the mobile communication equipment in order to determine a transmission output level of the mobile communication equipment.

Preferably, said radio-frequency power amplifier is mounted on the circuit board together with the modulator and frequency converter sections and a receiver system of the mobile communication equipment to thereby constitute a radio-frequency module which serves as a radio-frequency section of the mobile communication equipment.

More preferably, said radio-frequency power amplifier is configured in a form of an integrated circuit.

Since a radio-frequency section configured in the form of a module is compact in size and power saving, it eliminates difficulties in constructing mobile communication equipment based on, e.g., a W-CDMA (Wideband-Code Division Multiple Access) system which requires a large number of circuit component parts, strict linearity in transmission power, and much electric power. The radio-frequency section configured in the module form improves versatility of the radio-frequency section, so that the radio-frequency module is applicable to a variety of pieces of mobile communication equipment having various specifications.

With the radio-frequency power amplifier configured in the integrated-circuit form, the power amplifier can be fabricated so that its operation stability is ensured, whereby requirements in mounting the power amplifier on a circuit board are relieved. Together with its compactness in size, the power amplifier composed of an integrated circuit relaxing the mounting requirements makes it easy to configure the radio-frequency section in the module form.

Preferably, said radio-frequency power amplifier is mounted on portable mobile communication equipment. The radio-frequency power amplifier of this invention which is excellent in power efficiency is especially suitable for portable mobile communication equipment such as a portable telephone using a battery as power source.

DETAILED DESCRIPTION

With reference to the appended drawings, a radio-frequency (RF) power amplifier according to an embodiment of the present invention will be explained.

The RF power amplifier constitutes part of a transmission system of mobile communication equipment, e.g., a portable telephone for land-based mobile public communication based on a W-CDMA (Wideband-Code Division Multiple Access) system.

Figure 1:
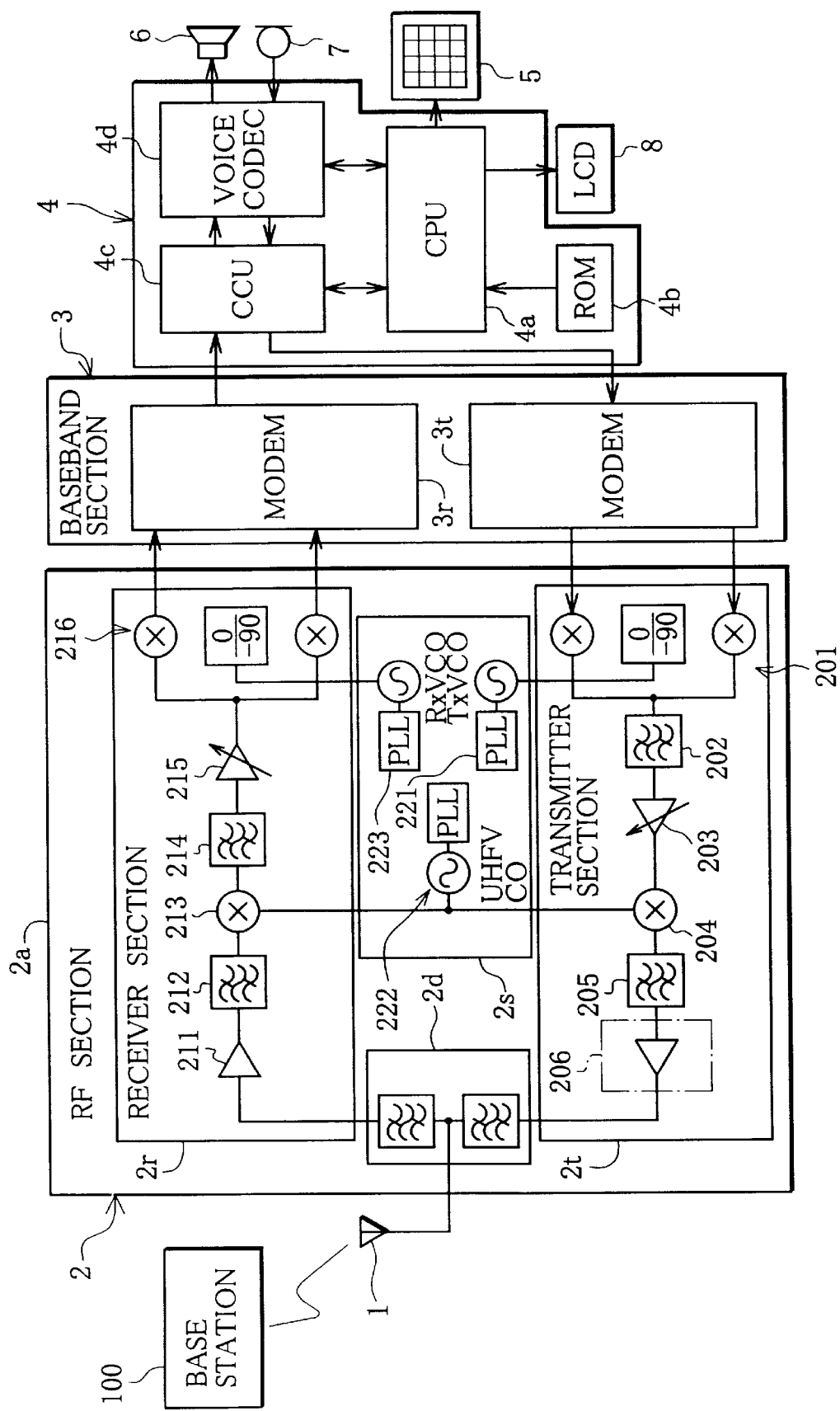
FIG. 1 is a schematic block circuit diagram showing a W-CDMA-system-based portable telephone which is provided with a radio-frequency power amplifier according to an embodiment of the present invention.

As shown in FIG. 1, the portable telephone comprises an antenna 1, a radio-frequency section 2, a baseband section 3, and a main control section 4.

The main control section 4, having a microprocessor including a CPU 4a and a ROM 4b, and a communication control unit 4c, automatically establishes and disconnects a radio wave circuit for telecommunication and automatically changes a channel for telecommunication in accordance with a command signal delivered from a base station 100 or from an operating panel 5 connected to the CPU and operable by a user. The main control section 4 further comprises a voice codec 4d to which a speaker 6 and a microphone 7 are connected. Reference numeral 8 denotes a liquid crystal display serving to display information for the user.

The radio-frequency section 2 is configured in the form of an RF module having a circuit board 2a on which a transmitter section 2t, receiver section 2r, frequency synthesizer section 2s, and duplexer 2d are mounted.

The transmitter section 2t comprises a quadrature phase-shift keying modulator (hereinafter referred to as QPSK modulator) 201. In connection with the QPSK, the baseband section 3 including a transmitter modem 3t receives, through the voice codec 4d and the communication control unit 4c of the main control section 4, an electrical signal obtained by sonic-electric conversion of voice at the microphone 7 and converts the same into a baseband signal. The QPSK modulator 201 modulates a carrier, generated in a phase locked loop circuit (PLL) 211, with use of the baseband signal (voice information).

The modulated carrier delivered from the QPSK modulator 201 is applied through a band pass filter (Tx IF BPF) 202 to an automatic gain control (AGC) amplifier 203 in which the output from the band pass filter 202 is amplified at an amplification gain varying in dependence on a gain control signal supplied from the base station 100 or from the main control section 4.

The output from the AGC amplifier 203 is applied to a frequency converter (UP Converter Tx) 204 in which the amplifier output is mixed with an UHF signal supplied from a voltage control oscillator (UHF VCO) 222 of the synthesizer section 2s, to be converted into a radio-frequency signal. This radio-frequency signal is applied through a band pass filter (Tx RF BPF) 205 to an RF power amplifier 206 which constitutes the primary part of the present invention and will be explained in detail. The radio-frequency signal amplified in the RF power amplifier 206 is applied through the duplexer 2d to the antenna 1 from which the radio-frequency signal is radiated.

The receiver section 2r of the radio-frequency section 2 comprises a low-noise amplifier (LNA) 211 to which a radio-frequency signal received by the antenna 1 is applied through the duplexer 2d. The radio-frequency signal amplified in the amplifier 211 is applied through a band pass filter (Rx RF BPF) 212 to a frequency converter (Down Converter) 213 in which the radio-frequency signal is converted into an intermediate frequency signal which is in turn applied through a band pass filter (Rx IF BPF) 214 and an automatic gain control amplifier (Rx AGC Amp) 215 to a QPSK demodulator 216 in which a baseband signal (voice information) is obtained. The baseband signal is applied, via a receiver modem 3r of the baseband section 3 and the communication control unit 4c and voice codec 4d of the main control section 4, to the speaker 6 in which the baseband signal is subject to electric-sonic conversion to generate voice.

Figure 2:
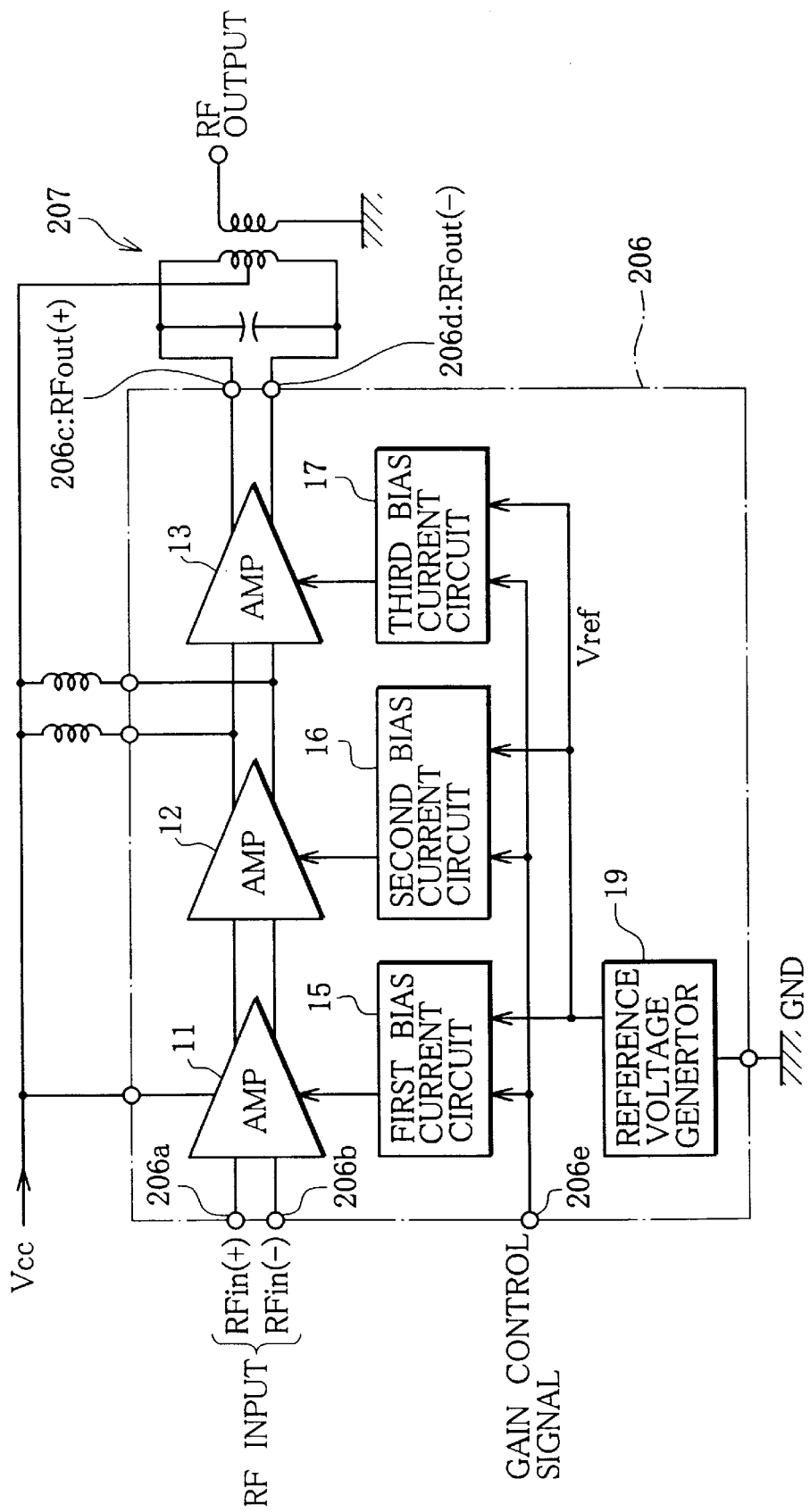
FIG. 2 is a schematic circuit diagram showing an RF power module serving as the radio-frequency power amplifier shown in FIG. 1 in the block form.

With reference to FIG. 2, the RF power amplifier constituting the primary part of the present invention will be explained in detail.

The RF power amplifier 206 of this embodiment is configured in the form of a monolithic integrated circuit (hereinafter referred to as RF power module 206) which is compact in size and is ensured in operation stability. As explained in the above with reference to FIG. 1, the RF power module 206 is mounted on a circuit board 2a together with circuit component parts which cooperate with the RF power module 206 to constitute the transmitter section 2t and circuit component parts constituting the receiver section 2r, whereby the radio-frequency section 2 is configured in the module form, i.e., the radio-frequency module 2. The RF power module 206 makes the radio-frequency module 2 compact and stabilized in operation. The RF power module 206 serves to amplify, with a desired gain (e.g., 5 dB, 10 dB or 30 dB), a radio-frequency signal of, e.g., 2 GHz modulated at the QPSK modulator (more generally, RF modulator) 201 and to output the amplified radio-frequency signal to the antenna 1.

As shown in FIG. 2, the RF power module 206 comprises an input stage which is comprised of first and second differential amplifiers 11 and 12 coupled directly to each other. The first differential amplifier 11 has its input terminals respectively connected to RF balanced-input terminals (RFin(+), RFin(−)) 206a and 206b of the module 206, to thereby balanced-input the radio-frequency signal. The RF power module 206 further comprises an output stage which is comprised of a push-pull circuit 13 having input terminals thereof connected to output terminals of the second differential amplifier 12 and output terminals thereof connected to RF balanced-output terminals (RFout(+), RFout(−)) 206c and 206d of the module 206, respectively. The push-pull circuit 13 is arranged to power-amplify the radio-frequency signal amplified in the differential amplifiers 11 and 12 and to balanced-output the amplified radio-frequency signal to the antenna 1.

First and second bias current circuits 15 and 16 connected to the first and second differential amplifiers 11 and 12, respectively, are supplied with an internal reference voltage Vref for their operations from a reference voltage generator 19. Each of the bias current circuits 15 and 16 varies a bias current supplied to a corresponding one of the differential amplifiers 11 and 12 in accordance with a gain control signal supplied from the base station 100 or the main control circuit 4, to thereby variably set the amplification gain of the corresponding differential amplifier. A third bias current circuit 17 connected to the push-pull circuit 13 varies a bias current supplied to the push-pull circuit 13 in accordance with the gain control signal, to thereby set an optimum DC bias current permitting the portable telephone to generate the transmission output of a desired level, while preventing a large electric power loss in the push-pull circuit 13.

The amplification gain with respect to the radio-frequency signal in each differential amplifier and in the push-pull circuit is set in the order of, e.g., 10 dB. The gain control of 20 dB for variable adjustment of the radio-frequency signal output (transmission output) is carried out by variably changing the bias current supplied to the differential amplifier 11 provided at the first stage of the RF power module 206.

In FIG. 2, reference numeral 206e denotes a gain control signal input terminal of the RF power module 206, reference numeral 207 denotes a tuning circuit, and symbol GND denotes a grounding pattern which is formed in the circuit board 2a. Further, the circuit board 2a is formed with a wiring pattern (not shown) through which circuit component parts mounted on the circuit board are connected to one another, and the radio-frequency grounding pattern (shown by symbol RF GND in FIG. 3), each of the wiring pattern and the pattern RF GND being formed independently of the grounding pattern GND.

Figure 3:
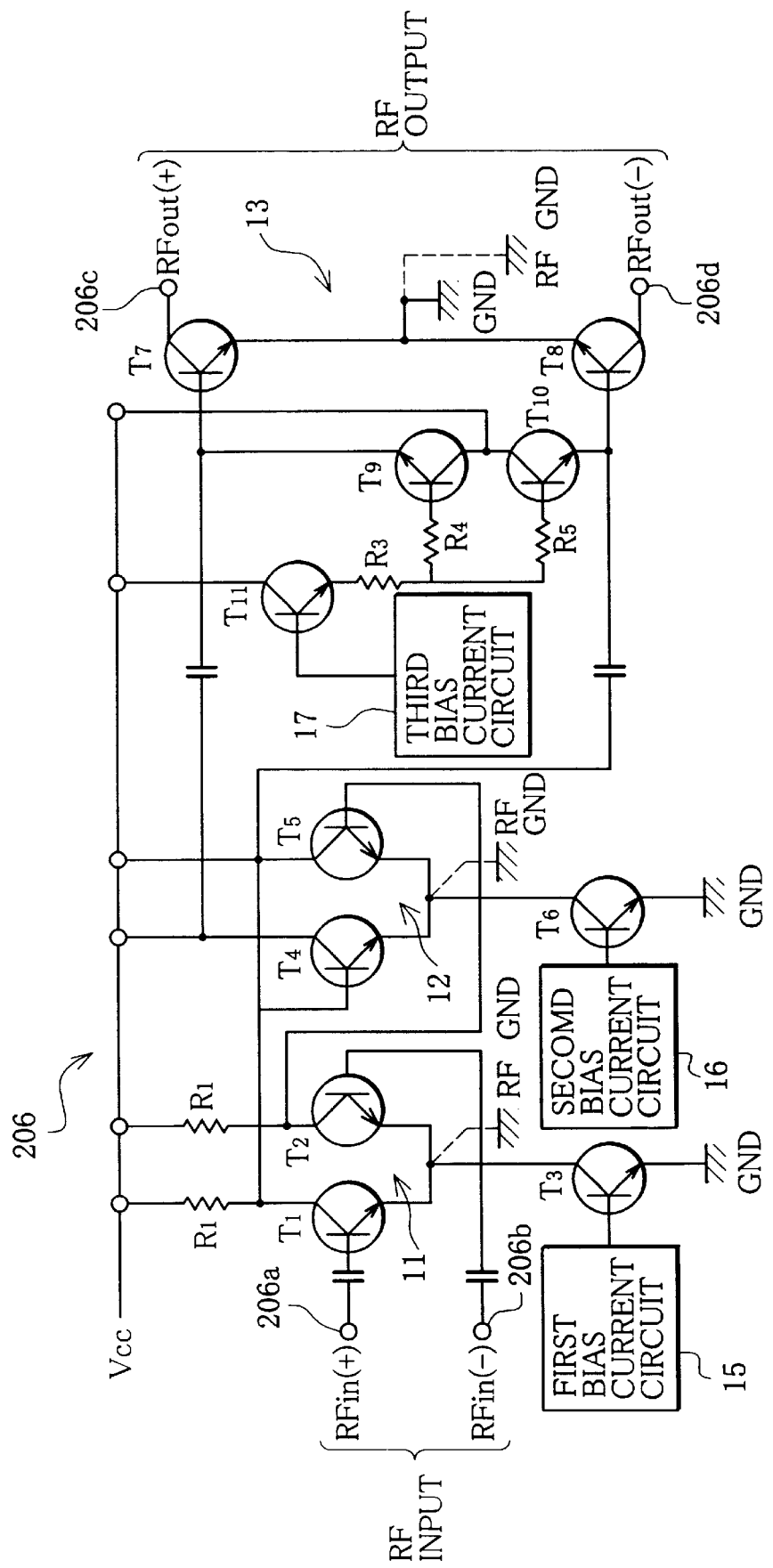
FIG. 3 is a circuit diagram showing by way of example a circuit arrangement of the RF power module shown in FIG. 2.

More specifically, as shown in FIG. 3, the RF power module 206 is mainly comprised of bipolar transistors T1, T2, . . . , T11. The first differential amplifier 11 of the RF power module is mainly comprised of a pair of transistors T1 and T2 having emitters thereof connected to each other and their collectors to which loading resistors R1 and R2 are connected, respectively. The first differential amplifier 11 constituted by the transistors T1 and T2 is driven by a constant current source constituted by a transistor T3 provided between the emitters of these transistors and the grounding (GND), and amplifies the radio-frequency signal which is balanced-input at the bases of the transistors Ti and T2 through capacitors.

The second differential amplifier 12 is mainly comprised of a pair of transistors T4 and T5 having emitters thereof connected to each other and bases thereof directly connected to the collectors of the transistors T1 and T2, respectively. The second differential amplifier 12 constituted by the transistors T4 and T5 is driven by a constant current source constituted by a transistor T6 provided between the emitters of these transistors and the grounding (GND), and balanced-amplifies the radio-frequency signal. That is, the second differential amplifier 12 amplifies the radio-frequency signal amplified in the first differential amplifier 11 and then applied to the bases of the transistors T4 and T5.

The constant current sources respectively comprised of the transistors T3 and T6 serve to vary the bias currents for the first and second differential amplifiers 11 and 12 in accordance with the gain control signal under the control of the bias current circuits 15 and 16, to thereby variably set the amplification gains of the differential amplifiers 11 and 12. This variable bias current control makes it possible to set amplification gains of the differential amplifiers 11 and 12 which meet the radio-frequency signal level and to perform the automatic gain control (AGC) for the radio-frequency signal.

Meanwhile, the bias current circuits 15 and 16 may be configured so as to control the operations of the transistors T3 and T6 in accordance with ambient temperature, to thereby achieve a temperature compensating function for the differential amplifiers 11 and 12.

The push-pull circuit 13 is mainly comprised of a pair of transistors T7 and T8 having emitters thereof both connected to the grounding and bases thereof respectively connected through capacitors to the collectors of the transistors T4 and T5 constituting the second differential amplifier 12. Thus, the push-pull circuit 13 balanced-inputs and amplifies the radio-frequency signal amplified in the differential amplifier 12, to thereby obtain its amplified output between the collectors of the transistors T7 and T8.

A pair of driving transistors T9 and T10 are provided between the bases of the transistors T7 and T8. These driving transistors T9 and T10 determine the base currents of the transistors T7 and T8, respectively, and hence determine the bias current for the push-pull circuit 13. Each of the driving transistors T9 and T10 is driven by the third bias current circuit 17 through a transistor T11 so as to cause a constant current to flow through the driving transistors. Under the control of the bias current circuit 17, these driving transistors T9 and T10 vary the base currents of the transistors T7 and T8, to thereby optimize the DC bias current for the push-pull circuit 13.

In the case that the output stage of the RF power module (RF power amplifier) 206 is configured in the form of a push-pull circuit in the above manner, the provision of a constant current circuit between emitter and grounding is unnecessary as distinct from the case where the output stage is configured in a differential amplifier circuit form, so that the maximum efficiency of utilizing the power source voltage can be achieved. On the other hand, the output stage configured in the push-pull amplifier circuit form having a bias-current variable control circuit provided between bases of transistors and grounding requires a circuit arrangement having high impedance with respect to radio-frequency signal. To this end, in this embodiment, resistors R3. R4; R3, R5 are respectively connected to the bases of the driving transistors T9 and T10 so as to increase the impedance of the driving transistors, whereby the bias current for the push-pull circuit 13 constituted by the transistors T7 and T8 can be optimized so as to prevent the increase in power loss, while maintaining stable operating conditions of the transistors T7 and T8 with respect to radio-frequency signal.

With the RF power module (RF power amplifier) 206 having the input stage thereof comprised of the differential amplifiers 11, 12 and the output stage thereof comprised of the push-pull circuit 13, the radio-frequency signal is input, amplified, and output in a balanced manner under a condition that the module is virtually grounded with respect to the RF grounding pattern of the printed circuit board on which the RF power module 206 is mounted. That is, the RF power amplifier 206 operates in a floating state with respect to the RF grounding pattern. Therefore, the RF power module 206 mounted on the printed circuit board stably operates without being affected by the RF grounding pattern.

With the RF power module 206 where the amplification gains of the differential amplifiers 11 and 12 are changed by changing the bias currents applied to these differential amplifiers, the gain control can be made easily and the amplification gain can be changed with stability.

In order to decrease the transmission output power, the bias currents for the differential amplifiers 11, 12 and the push-pull circuit 13 of the module 206 are decreased so that the amplification gains of these amplifier elements 11, 12 and 13 are decreased. At the low transmission output level, since the bias currents for the amplifier elements 11, 12 and 13 are decreased in this manner and since the bias current for the push-pull circuit 13 is optimized in accordance with the transmission output level, an undesired power loss can be avoided while maintaining the linearity of the transmission signal, even when the transmission output is greatly reduced from its maximum output. In particular, a large reduction in power efficiency in the push-pull circuit 13 can be prevented. Thus, power consumption can be reduced as the transmission output is varied in a wide range, especially, when the transmission output is at a low level.

Figure 4:
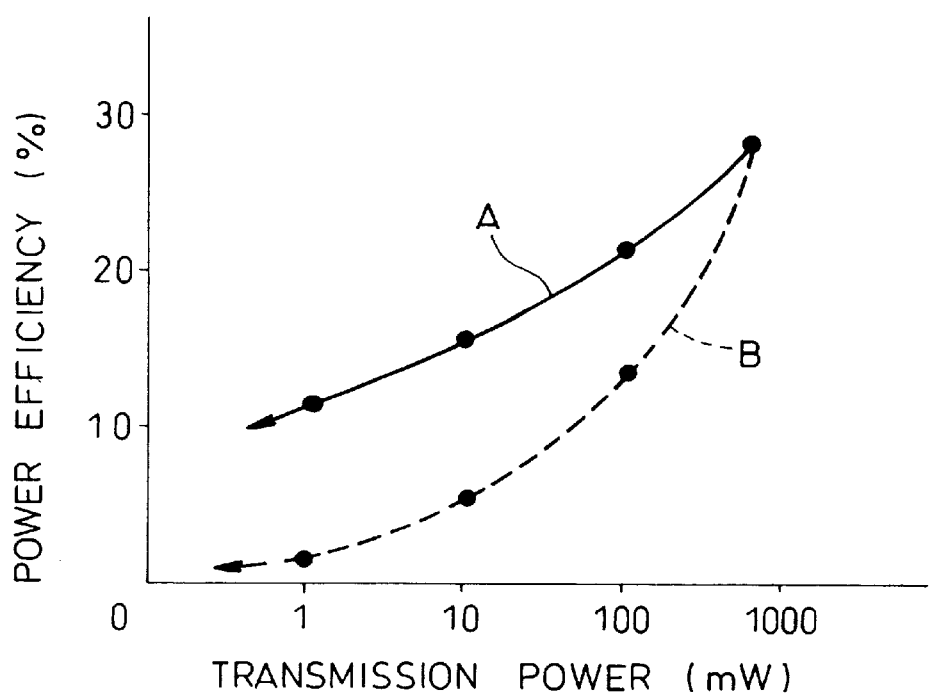
FIG. 4 is a graph showing the relationship between transmission output and power efficiency in the RF power module shown in FIGS. 2 and 3, together with a similar relationship in a conventional radio-frequency power amplifier.

The relationship between transmission output power and power efficiency in the RF power module 206 is exemplarily shown by solid line A in FIG. 4, and a similar relationship in a conventional RF power amplifier is shown by broken line B in FIG. 4. As seen from FIG. 4, at the time of decreasing the transmission power to about 1 mW, the power efficiency of the RF power module 206 is about 10% whereas that of the conventional RF power amplifier is about 1%. Thus, the power efficiency of the RF power module 206 at the low transmission output level region is extremely high.

Figure 5:
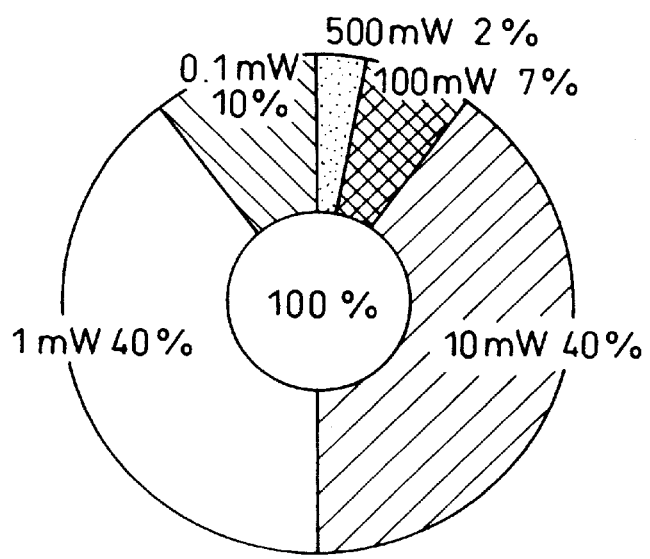
FIG. 5 is a graph showing the relationship between transmission power level ranges and frequency of usage of these ranges in a portable telephone.

FIG. 5 shows the relationship between transmission output level range and frequency of usage thereof in a portable telephone, for CDMA system, of maximum transmission output power of 1 W. As apparent from FIG. 5, the portable telephone is rarely operated at its maximum output level, and is operated in most cases at low output levels less than 10 mW. In view of this tendency, it is important to improve the signal quality at low output level region less than 10 mW and the power efficiency in this region. According to the RF power module 206, an adjustment of transmission output can be made by simply adjusting bias currents for the differential amplifiers 11, 12 and the push-pull circuit 13, and the power efficiency can be improved especially in a low transmission output level region. Thus, the RF power module 206 has a significant power saving effect.

The present invention is not limited to the preferred embodiment explained in the above, but may be modified variously.

For example, depending on the amplification gain required to obtain the transmission signal of a desired level, the input stage of the RF power amplifier (RF power module) may be constructed by a single differential amplifier or by three or more differential amplifiers directly coupled to one another. Output transistors constituting the output stage of the RF power amplifier may be Darlington-connected.

The RF power amplifier may be constructed with use of pnp transistors although npn transistors are employed for the amplifier in the preferred embodiment. In case that the RF power module is configured in the form of a monolithic integrated circuit, HBT (heterojunction bipolar transistor), PHEMT (pseudo-morphic high electron mobility transistor), MESFET, IGBT (insulated gate bipolar transistor) or the like made of compound semiconductor belonging to the group III-IV such as GaAs may be used.

The RF power amplifier is not inevitably required to be configured in an integrated circuit form although the power amplifier comprised of such integrated circuit is used in the preferred embodiment.

The automatic gain control circuit 203 may be removed from the transmitter section 2*t* since the RF power amplifier 206 has an automatic gain control function as mentioned above.

The radio-frequency power amplifier of this invention may be mounted on various types of mobile communication equipment and is particularly suited to portable mobile communication equipment which requires reduction in power consumption, although a W-CDMA-system-based portable telephone has been explained in the preferred embodiment. Respective sections of mobile communication equipment may have circuit arrangements suited to the specification of the communication equipment.

In the present invention, either the input stage or the output stage of a radio-frequency power amplifier may be constituted by a balanced circuit and the other may be configured by an unbalanced circuit, although both the input stage 11, 12 and the output stage 13 of the RF power amplifier 206 in the preferred embodiment are formed by balanced circuits.

Figure 6:
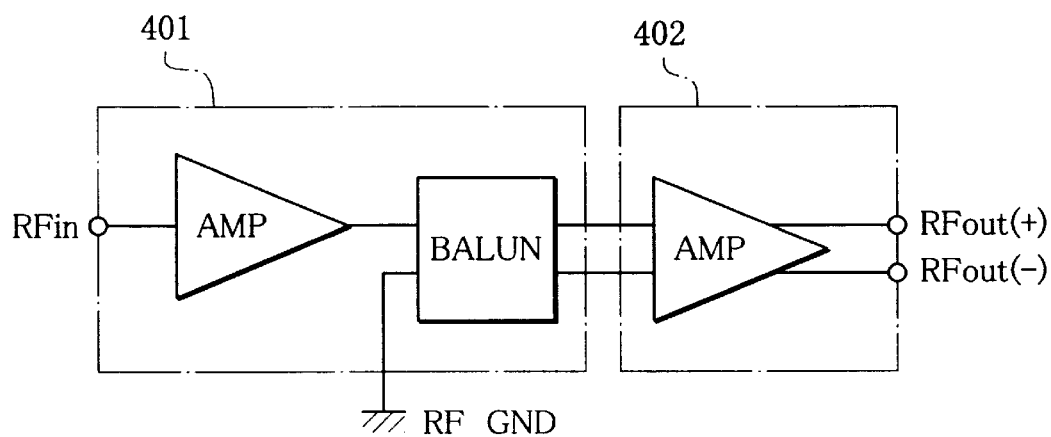
FIG. 6 is a schematic block diagram showing a modification of an RF power amplifier of the present invention.
Figure 7:
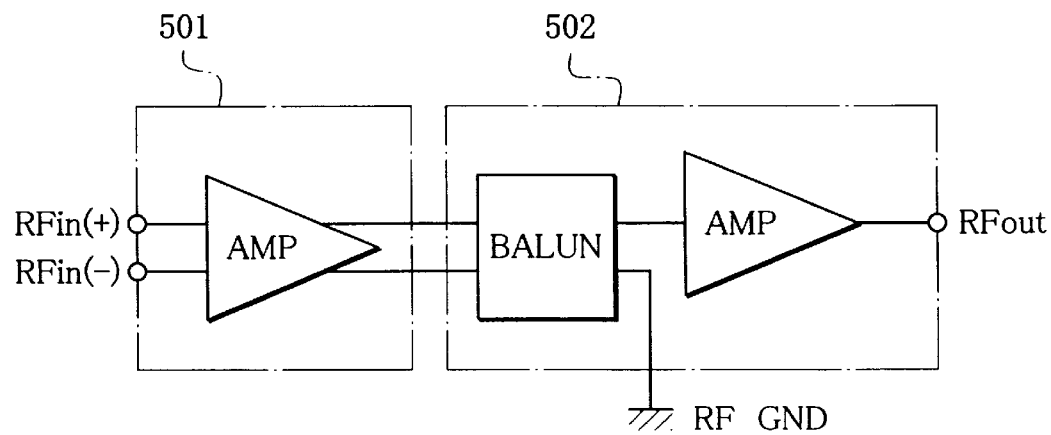
FIG. 7 is a schematic block diagram showing another modification of an RF power amplifier of the present invention.

FIG. 6 schematically shows an RF power amplifier having an input stage 401 thereof comprised of an unbalanced circuit which includes an amplifier and a balun, and an output stage 402 thereof comprised of a balanced circuit. FIG. 7 schematically shows an RF power amplifier having an input stage 501 thereof comprised of a balanced circuit and an output stage 502 thereof comprised of an unbalanced circuit which includes a balun and an amplifier. Symbol RF GND denotes an RF grounding pattern. In FIGS. 6 and 7, an illustration of a bias current circuit is omitted.

What it claimed is:

1. A radio-frequency power amplifier of mobile communication equipment, comprising:

an input stage including at least one differential amplifier arranged to balanced-input and amplify a radio-frequency signal delivered from a frequency converter section of a transmission system of the mobile communication equipment located downstream of a modulator section of the transmission system; and a bias current circuit for supplying said at least one differential amplifier with a bias current varying in dependence on a gain control signal, to thereby variably set a gain of said at least one differential amplifier, said radio-frequency power amplifier being mounted on a circuit board of the mobile communication equipment, said circuit board being formed with a radio-frequency grounding pattern, wherein said input stage of said radio-frequency power amplifier amplifies the radio-frequency signal under a floating condition with respect to the radio-frequency grounding pattern.

2. The radio-frequency power amplifier according to claim 1, wherein said input stage of said radio-frequency power amplifier is comprised of a plurality of differential amplifiers which are direct-coupled to one another, and said bias current circuit is provided for each of said plurality of differential amplifiers.

3. The radio-frequency power amplifier according to claim 1, wherein the gain control signal is a signal which is transmitted from a base station or a control section of the mobile communication equipment in order to determine a transmission output level of the mobile communication equipment.

4. The radio-frequency power amplifier according to claim 1, wherein said radio-frequency power amplifier is mounted on the circuit board together with the modulator and frequency converter sections and a receiver system of the mobile communication equipment to thereby constitute a radio-frequency module which serves as a radio-frequency section of the mobile communication equipment.

5. The radio-frequency power amplifier according to claim 4, wherein said radio-frequency power amplifier is configured in a form of an integrated circuit.

6. The radio-frequency power amplifier according to claim 4, wherein said radio-frequency power amplifier is mounted on portable mobile communication equipment.

7. A radio-frequency power amplifier of mobile communication equipment, comprising:

an output stage including a push-pull circuit arranged to amplify and balanced-output a radio-frequency signal received through an input stage of said amplifier from a frequency converter section of a transmission system of the mobile communication equipment located downstream of a modulator section of the transmission system; and a bias current circuit for supplying said push-pull circuit with a bias current varying in dependence on a gain control signal, said radio-frequency power amplifier being mounted on a circuit board of the mobile communication equipment, said circuit board being formed with a radio-frequency grounding pattern, wherein said output stage of the radio-frequency power amplifier amplifies the radio-frequency signal under a floating condition with respect to the radio-frequency grounding pattern.

8. The radio-frequency power amplifier according to claim 7, wherein said bias current circuit varies an operating current of a constant current circuit connected with bases of a pair of transistors which form said push-pull circuit, to thereby vary the bias current applied to said push-pull circuit.

9. The radio-frequency power amplifier according to claim 7, wherein the gain control signal is a signal which is transmitted from a base station or a control section of the mobile communication equipment in order to determine a transmission output level of the mobile communication equipment.

10. The radio-frequency power amplifier according to claim 7, wherein said radio-frequency power amplifier is mounted on the circuit board together with the modulator and frequency converter sections and a receiver system of the mobile communication equipment to thereby constitute a radio-frequency module which serves as a radio-frequency section of the mobile communication equipment.

11. The radio-frequency power amplifier according to claim 10, wherein said radio-frequency power amplifier is configured in a form of an integrated circuit.

12. The radio-frequency power amplifier according to claim 10, wherein said radio-frequency power amplifier is mounted on portable mobile communication equipment.

13. A radio-frequency power amplifier of mobile communication equipment, comprising:

an input stage including at least one differential amplifier arranged to balanced-input and amplify a radio-frequency signal delivered from a frequency converter section of a transmission system of the mobile communication equipment located downstream of a modulator section of the transmission system;

a first bias current circuit for supplying said at least one differential amplifier with a bias current varying in dependence on a gain control signal, to thereby variably set a gain of said at least one differential amplifier;

an output stage including a push-pull circuit arranged to receive the radio-frequency signal amplified in and delivered from said input stage and to amplify and balanced-output the amplified radio-frequency signal; and a second bias current circuit for supplying said push-pull circuit with a bias current varying in dependence on the gain control signal, said radio-frequency power amplifier being mounted on a circuit board of the mobile communication equipment, said circuit board being formed with a radio-frequency grounding pattern, wherein said input stage and said output stage of said radio-frequency power amplifier amplifies the radio-frequency signal and amplified radio-frequency signal, respectively, under a floating condition with respect to the radio-frequency grounding pattern.

14. The radio-frequency power amplifier according to claim 13, wherein said input stage of said radio-frequency power amplifier is comprised of a plurality of differential amplifiers which are direct-coupled to one another, and said bias current circuit is provided for each of said plurality of differential amplifiers.

15. The radio-frequency power amplifier according to claim 13, wherein said second bias current circuit varies an operating current of a constant current circuit connected with bases of a pair of transistors which form said push-pull circuit, to thereby vary the bias current applied to said push-pull circuit.

16. The radio-frequency power amplifier according to claim 13, wherein the gain control signal is a signal which is transmitted from a base station or a control section of the mobile communication equipment in order to determine a transmission output level of the mobile communication equipment.

17. The radio-frequency power amplifier according to claim 13, wherein said radio-frequency power amplifier is mounted on the circuit board together with the modulator and frequency converter sections and a receiver system of the mobile communication equipment to thereby constitute a radio-frequency module which serves as a radio-frequency section of the mobile communication equipment.

18. The radio-frequency power amplifier according to claim 17, wherein said radio-frequency power amplifier is configured in a form of an integrated circuit.

19. The radio-frequency power amplifier according to claim 17, wherein said radio-frequency power amplifier is mounted on portable mobile communication equipment.

\* \* \* \* \*